US012792166B2

(12) United States Patent
Schmitt et al.

(10) Patent No.: US 12,792,166 B2
(45) Date of Patent: Nov. 10, 2026

(54) OPERATING INPUT DEVICE AND METHOD FOR OPERATING AN OPERATING INPUT DEVICE

(71) Applicant: VALEO SCHALTER UND SENSOREN GMBH, Bietigheim-Bissingen (DE)

(72) Inventors: Martin Schmitt, Bad Rodach (DE); Raphael Sturm, Bad Rodach (DE)

(73) Assignee: Valeo Schalter und Sensoren GmbH, Bietigheim-Bissingen (DE)

( * ) Notice: Subject to any disclaimer, the term of this patent is extended or adjusted under 35 U.S.C. 154(b) by 182 days.

(21) Appl. No.: 18/708,448

(22) PCT Filed: Nov. 7, 2022

(86) PCT No.: PCT/EP2022/080905

§ 371 (c)(1),
(2) Date: May 8, 2024

(87) PCT Pub. No.: WO2023/083724

PCT Pub. Date: May 19, 2023

(65) Prior Publication Data

US 2025/0026201 A1 Jan. 23, 2025

(30) Foreign Application Priority Data

Nov. 10, 2021 (DE) ..................... 10 2021 129 243.3

(51) Int. Cl.
*G06F 3/041* (2006.01)
*B60K 35/10* (2024.01)

(52) U.S. Cl.
CPC .............. *G06F 3/041* (2013.01); *B60K 35/10* (2024.01); *B60K 2360/1446* (2024.01); *G06F 2203/04105* (2013.01)

(58) Field of Classification Search
CPC . B60K 35/10; B60K 2360/1446; G06F 3/041; G06F 2203/04105
See application file for complete search history.

(56) References Cited

U.S. PATENT DOCUMENTS

| | | | | |
|---|---|---|---|---|
| 10,871,874 | B2 | 12/2020 | Sullivan et al. | |
| 2019/0338561 | A1* | 11/2019 | Wachinger | G06F 3/03548 |
| 2022/0293376 | A1* | 9/2022 | Stallein | G06F 3/016 |

FOREIGN PATENT DOCUMENTS

| | | | |
|---|---|---|---|
| DE | 102015006605 | B3 | 9/2016 |
| DE | 102015008573 | A1 | 1/2017 |

(Continued)

OTHER PUBLICATIONS

International Search Report in corresponding International Application No. PCT/EP2022/080905, dated Feb. 27, 2023 (6 pages).

(Continued)

*Primary Examiner* — Temesghen Ghebretinsae
*Assistant Examiner* — Sosina Abebe
(74) *Attorney, Agent, or Firm* — Osha Bergman Watanabe & Burton LLP

(57) ABSTRACT

An operating input apparatus for a motor vehicle is disclosed. The apparatus includes an operating surface, at least one touch sensor device for detecting a touching of the operating surface by an operator, at least one force sensor device for detecting an actual operating force applied to the operating surface, and an evaluation apparatus for determining an actuation state of the operating input device. The touch sensor device is configured to generate and output a touch signal. The force sensor device is configured to generate and output an actual force signal dependent on the actual operating force applied. The evaluation apparatus is configured to determine the actuation state of the operating input device at least as a function of the touch signal, the actual force signal, and an associated basic force value and (Continued)

Figure 1:
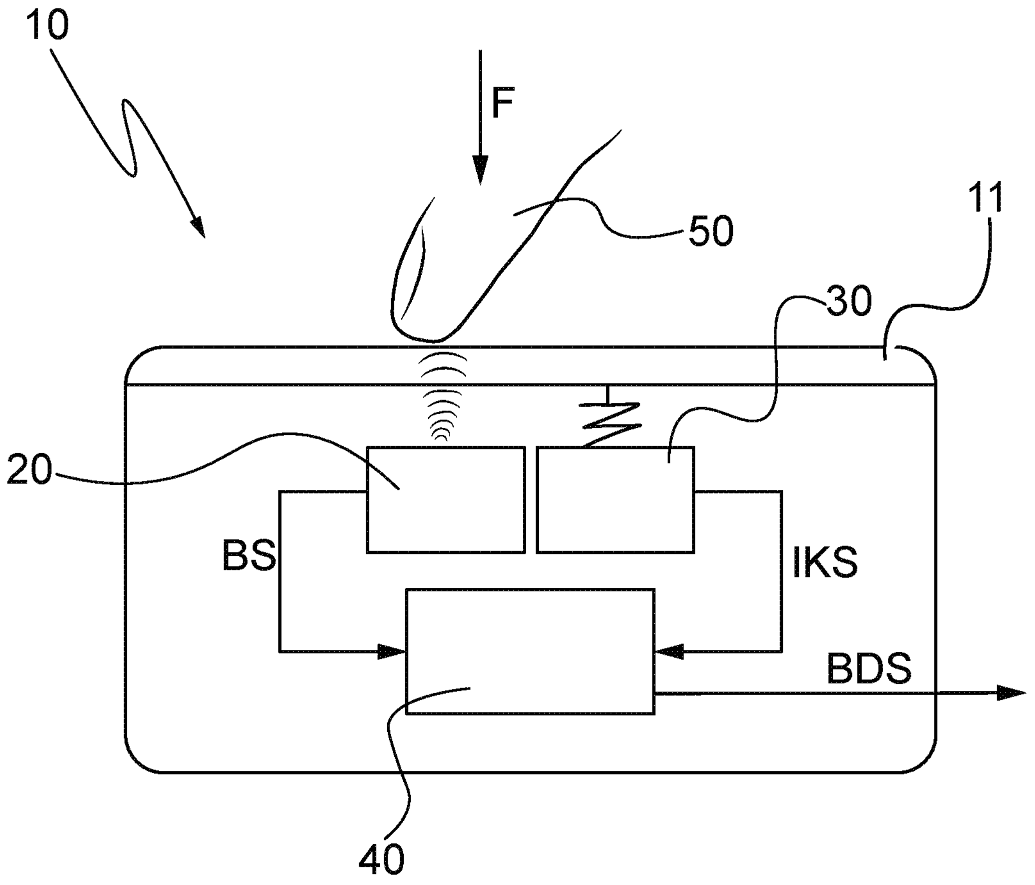

to generate and output an operating signal characterizing the actuation state of the operating input device.

14 Claims, 4 Drawing Sheets

(56) References Cited

FOREIGN PATENT DOCUMENTS

| | | | |
|---|---|---|---|
| DE | 102018115220 | A1 | 1/2020 |
| DE | 102020107752 | A1 | 9/2021 |

OTHER PUBLICATIONS

Written Opinion in corresponding International Application No. PCT/EP2022/080905, dated Feb. 27, 2023 (5 pages).

* cited by examiner

OPERATING INPUT DEVICE AND METHOD FOR OPERATING AN OPERATING INPUT DEVICE

The present invention relates to an operating input device, in particular for a motor vehicle, wherein the operating input device has an operating surface, at least one touch sensor device for detecting a touch of the operating surface by an operator, at least one force sensor device for detecting an actual operating force applied to the operating surface, and an evaluation apparatus for determining an actuation state of the operating device. The touch sensor device is set up to generate and output a touch signal. The force sensor device is set up to generate and output an actual force signal dependent on the current operating force applied, and the evaluation apparatus is set up to determine the actuation state of the operating input device at least as a function of the touch signal, the actual force signal and an associated current basic force value, and to generate and output an operating signal characterizing the actuation state of the operating input device.

The present invention also relates to a method for operating such an operating input device.

Generic operating input devices with a touch sensor device and a force sensor device as well as corresponding methods for operating such operating input devices are generally known from the prior art. Refer, by way of example, to U.S. Pat. No. 10,871,874 B2.

Against this background, it is an object of the present invention to provide an alternative, in particular an improved operating input device, in particular an operating input device which can be realized in a particularly space-saving or installation-space-saving manner, but which nevertheless enables good accuracy in the detection of an operating input, in particular good accuracy in the detection of an applied operating force and, as a result, a high detection rate.

In addition, it is an object of the present invention to provide an alternative, in particular an improved method for operating such an operator input device, in particular a method which enables a good accuracy, in particular a high resolution, in the detection of an operator input, but which nevertheless enables the realization of a particularly space-saving or installation-space-saving operator input device.

This object is achieved according to the invention by an operating input device and by a method for operating such an operating input device having the features according to the respective independent claims. Advantageous embodiments of the invention are the subject matter of the dependent patent claims, of the description and of the figures. The wording of the claims is made part of the content of the description by express reference.

An operating input device according to the present invention is designed in particular for a motor vehicle, preferably for a passenger car or a truck, particularly preferably for arrangement in the interior of a motor vehicle, and has an operating surface, at least one touch sensor device for detecting a touch of the operating surface by an operator, at least one force sensor device for detecting an actual operating force applied to the operating surface and an evaluation apparatus for determining an actuation state of the operating device.

The touch sensor device is set up here to generate and output a touch signal. The force sensor device is set up to generate and output an actual force signal dependent on a current applied operating force, and the evaluation apparatus is set up to determine the actuation state of the operating input device at least as a function of the touch signal, the actual force signal and an associated current basic force value, and to generate and output an operating signal characterizing the actuation state of the operating input device.

The operating input device can basically assume an unactuated initial state and at least one actuation-expected state, wherein in the unactuated initial state the current basic force value corresponds to the value of the currently detected actual force signal and in an actuation-expected state the current basic force value is a defined force value in each case.

According to the invention, the operating input device is set up to switch from the unactuated initial state to a first actuation-expected state when, in particular as soon as, contact with the operating surface is detected, and/or to to determine a force signal gradient of the applied and detected operating force as a function of the actual force signal and to compare the determined force signal gradient with a predefined gradient threshold value and, if the determined force signal gradient of the applied and detected operating force exceeds the predefined gradient threshold value, to change from the unactuated initial state to a second actuation-expected state.

The simultaneous presence of a touch sensor device and a force sensor device makes it possible, as is generally known from the prior art, to easily prevent unintentional actuation by mere contact without sufficient operating or actuating force. For example, an operating input is only recognized as an actuation of the operating input device when a minimum operating input force has been applied to the operating surface of the operating input device or only when a sufficient operating force has been applied.

Preferably, an operating input device according to the present invention is accordingly designed and set up in such a way that an operator must both touch the operating surface and apply sufficient operating force, for example by applying pressure, in order to trigger a corresponding actuation of the operating input and thus a desired operating function.

By evaluating the actuation state as a function of a detected actual force signal and a base force value, in particular relative to this, and not by a purely absolute evaluation of the actual force signal, a high detection accuracy of the applied operating force and consequently a high detection rate of the operating inputs can also be achieved even with small operating forces.

Low operating forces required in turn enable the use of smaller and therefore particularly space-saving or installation-space-saving components, as the components can be dimensioned smaller due to the lower operating forces and, as a result, smaller component dimensions in particular can be achieved.

The use of small parts or components in turn enables the integration of the operating input device into smaller control elements or the integration of a larger number of control elements in an available installation space.

In addition, smaller operating forces also make it possible to keep a deflection of the operating surface below a defined value, for example below an optical perception threshold, for example below 0.2 mm, but still detect an actuation of the operating input device. This has the advantage that an operator no longer visually perceives the deflection of the operating surface during operation. This makes it possible to achieve a higher-quality impression of the operating input device without additional measures, for example without using a stiffer control surface, or to arrange the operating input device below decorative and/or functional surfaces.

With an embodiment of an operating input device according to the invention, a particularly advantageous operating input device can thus be provided, in particular an operating input device which can be realized in a particularly space-saving or installation-pace-saving manner, but at the same time still enables a good accuracy of the detection of an operating input or an actuation.

A touch sensor device of an operating input device according to the invention is particularly preferably a capacitive touch sensor device, which is designed to generate and output a corresponding touch signal when the operating surface is touched, for example by a finger of a human hand or the like, in particular to the evaluation apparatus of the operating input device. Here, the touch signal particularly preferably contains signal information as to whether the operating surface is currently being touched or not.

The force sensor device of an operating input device according to the invention is preferably an optical force sensor device or a so-called MEMS (Micro-Electro-Mechanical Systems) force sensor device, as is known in principle from the prior art. Sensor devices of this type have the advantage that they are particularly small, i.e., they can be designed to be particularly space-saving, and enable a high level of accuracy even with low operating forces.

The actual force signal generated and output by the force sensor device, which is preferably also output to the evaluation apparatus of the operating input device, preferably contains at least one piece of signal information about a currently applied operating force, in particular signal information about an operating force applied to the operating surface in a direction perpendicular to the operating surface or about a proportion of an operating force applied to the operating surface in a direction perpendicular to the operating surface.

A basic force value in the sense of the present invention is in particular a reference force value, which in particular represents a reference or a basis for the evaluation of the determined actual force signal. As explained above, in the unactuated initial state, the current basic force value corresponds to the value of the currently detected actual force signal, while in an actuation-expected state, the current basic force value is a defined force value in each case.

The "defined force value" can, for example, be a predetermined force value stored in the evaluation apparatus, such as a constant force value or the like, or a force value defined at the respective time by a calculation according to a formula or another value from another available and suitable source or the like. However, the defined force value is particularly preferably a value that is or has been determined as a function of the respective state of the operating input device. For example, the defined force value can be an average of the actual force values from a defined period in the past. However, the defined force value is particularly preferably a value of the actual force signal at a specific time in the past, in particular a frozen, i.e., constant, actual force value from the past.

An "unactuated initial state" in the sense of the present invention is preferably a state of the operating input device in which the operating input device is unactuated, i.e., in which neither the operating surface is touched nor an operating force is applied to the operating surface and this has not just occurred or has not occurred recently, in particular not within a defined time window in the past.

For the purposes of the present invention, an "actuation-expected state" is preferably understood to be a state in which a successful operating input is expected to occur soon, for example by applying a sufficient operating force in addition to an existing touch or by applying a sufficient operating force and touching the operating surface in a touch-sensitive area after applying an operating force with a force signal gradient that exceeds the gradient threshold.

It should be noted that the individual states of the operating input device within the meaning of the present invention are in particular theoretical states of the operating input device for a simpler description of the present invention, in particular for a simpler explanation of the logic underlying the invention or the functionality underlying the invention, and that it is not absolutely necessary for these individual states to be implemented through programming as actual states with measurable state variables, or corresponding state signals, when controlling an operating input device according to the invention, but this can also be the case.

In a possible and advantageous embodiment of an operating input device according to the invention, in particular in a development, the defined force value, which represents the current basic force value in an actuation-expected state or is assigned to the current basic force value or defines it, is in particular a frozen, in particular past, actual force value of an operating force applied to the operating surface, preferably the frozen actual force value which is defined at the time of detection of contact with the operating surface or at the time of exceeding the gradient threshold value. This makes it possible to achieve a particularly high detection accuracy and a particularly good evaluation of the operating force applied to the operating surface.

In a further advantageous embodiment, the evaluation apparatus is set up in particular to recognize the operating input device as "actuated" and to output a corresponding operating signal if, while the operating input device is in the first actuation-expected state or in the second actuation-expected state, i.e., in particular if a touch has already been detected or a force signal gradient has exceeded the defined gradient threshold value, a sufficient operating force has subsequently been applied to the operating surface and the applied operating force is recognized as sufficient.

In a further possible and particularly preferred embodiment of an operating input device according to the present invention, the evaluation apparatus is in particular set up, in particular to determine, whether or not a sufficient operating force has been or is being applied to the operating surface, to determine a difference between the current actual force value of the actual force signal and the current base force value, and to compare the determined difference with a predetermined difference threshold value, wherein the evaluation apparatus is particularly preferably set up to recognize an applied operating force as sufficient at least in the first actuation-expected state or to recognize the operating input device as "actuated" and to output a corresponding operating signal if the determined difference exceeds the predetermined difference threshold value, in particular as soon as the determined difference exceeds the predetermined difference threshold value. Preferably, the difference can be determined when the operating input device is in the first actuation-expected state or in the second actuation-expected state. An operating input device according to the invention can also be set up to recognize an applied operating force as sufficient in the second actuation-expected state or to recognize the operating input device as "actuated" and to output a corresponding operating signal if the determined difference exceeds the predetermined difference threshold value, in particular as soon as the determined difference exceeds the predetermined difference threshold value.

The formation of the difference between the current value of the actual force signal and the basic force value in conjunction with the assignment of the current actual force signal to the basic force value or the tracking of the basic force value when the operating input device is in an unactuated initial state, or the assignment of the actual force value applied and the freezing of this when a touch is detected or when the gradient threshold value is exceeded, means that the difference is always zero in the unactuated initial state, while in an actuation-expected state the difference changes even with small changes in the actual force signal. This allows a particularly fine resolution or a high accuracy of a change in detection accuracy to be achieved.

It is particularly preferred that the gradient threshold value is set so high that interference in the environment of the operating input device, for example when used in a vehicle, corresponding shocks or vibrations during driving, preferably do not lead to the gradient threshold value being exceeded, but particularly preferably always only lead to a difference below the gradient threshold value. In particular, this reduces the number of false positive operator inputs due to signal fluctuations in the actual force signal, for example as a result of vibrations or similar, and thus improves the detection rate.

In a further, particularly advantageous embodiment of an operating input device according to the invention, the evaluation apparatus is preferably set up to recognize the operating input device as "actuated" when the operating input device is in the second actuation-expected state, in which in particular a subsequent touch is expected, and to output a corresponding operating signal only when, preferably additionally within a defined time window after the determined difference has exceeded the predetermined threshold value or an applied operating force has been recognized as sufficient, contact with the operating surface is recognized.

This makes it possible to detect unintentional operating input, for example by accidentally pressing outside the operating surface, as unwanted operating input. Likewise, imprecise but intentional operating inputs can be better recognized, for example operating inputs in which an operator places a finger outside the touch-sensitive operating surface, but presses and applies an operating force, but then continues to move his finger into the touch-sensitive area of the operating surface with sufficient operating force, for example by swiping.

In particular, an operating input device according to the invention is designed and set up in such a way that, at least in some cases, touching the operating surface in an unactuated initial state, but without a sufficient operating force already being applied to the operating surface when the touching begins, causes the operating input device to change from the unactuated initial state to a first actuation-waiting state in which, in addition to the existing touch, a sufficient operating force is awaited. This allows a high level of operating convenience to be achieved, as even less precise but still desired operating inputs can be correctly recognized as operating inputs. This case can occur, for example, if an operator places his finger on the operating surface within a corresponding, touch-sensitive operating input field on the operating surface, but does not yet press with sufficient operating force to trigger the actuation of the operating input device and thus a corresponding operating input.

Alternatively or additionally, an operating input device according to the invention is furthermore designed and set up in particular in such a way that, if the determined force signal gradient exceeds the predefined gradient threshold value, a change is made from the unactuated initial state to a second actuation-expected state, in which in particular the application of a sufficient operating force and contact is subsequently expected. This can also improve ease of use, as less precise operating inputs are required, but can still be correctly recognized as operating inputs, in particular without significantly increasing the number of false positive operating inputs. This case can occur, for example, if a user does not touch the operating surface within a touch-sensitive control panel in which a touch can be recognised, but outside of it, but already exerts a significant operating force on the surface, in particular such that the gradient threshold value is exceeded, and then continues to move his finger—into the touch-sensitive area of the operating surface while applying a corresponding operating force, in particular while applying a sufficient operating force—. In this case, an operating force is detected first and then the touch required for successful operator input.

In a further advantageous embodiment of an operating input device according to the invention, the operating input device is set up in particular to switch from the first actuation-waiting state back to the unactuated initial state if, in the first actuation-waiting state, before an actuation has been detected, contact with the operating surface is no longer detected, i.e., if the operating surface is no longer touched.

The change to the unactuated initial state can take place immediately or directly as soon as it is detected that the operating surface is no longer being touched, or with a defined time delay. Particularly preferably, as soon as the operating input device changes back to the unactuated initial state, the value of the current actual force signal is assigned to the base force value again, so that the base force is tracked to the actual force signal. This results in a difference between the actual force signal value and the base force value of zero in the unactuated initial state.

In a further advantageous embodiment of an operating input device according to the present invention, the operating input device is furthermore arranged in particular to change from a second actuation-expected state to the first actuation-expected state if contact is detected in the second actuation-expected state before a sufficient actuating force has been detected. As a result, the operating comfort of an operating input device according to the invention can be further improved. Particularly preferably, the operating input device is set up to update the basic force value when changing from the second actuation-expected state to the first actuation-expected state, in particular to refreeze the actual force value, preferably by assigning the actual force value to the basic force value, which was recorded at the time the touch of the control surface was detected. This makes it particularly easy to switch between different states of the operating input device. This is advantageous for fast and reliable detection of operator inputs.

In a further advantageous embodiment of an operating input device according to the invention, the operating input device is also preferably set up to switch back to the unactuated initial state after an actuation has been detected, in particular from the first actuation-expected state and/or from the second actuation-expected state, as soon as the determined force signal gradient of the applied and detected operating force falls below the predefined gradient threshold value again, and/or contact is no longer detected, and/or a defined delay time has elapsed after the end of contact.

Particularly preferably, an operating input device according to the present invention is set up to switch back to the unactuated initial state only when the three aforementioned conditions are cumulatively present, i.e., only when the determined force signal gradient of the applied and detected operating force falls below the predefined gradient threshold value again AND no more contact is detected AND a defined delay time has elapsed after the end of the contact.

In principle, the individual conditions can also be used individually or in any combination as triggers for a change back to the unactuated initial state. However, it has proven to be particularly advantageous if these must be fulfilled cumulatively.

A method according to the invention for operating an operating input device according to the invention is characterized in that the following steps are carried out at least temporarily in an unactuated initial state:

1.a) detecting a current actual force value of an operating force applied to the operating surface, 1.b) determining whether the operating surface is being touched by an operator, if no touching of the operating surface by an operator has been detected:

1.c) assigning the detected, current actual force value to a base force value, and 1.d) repeating steps a) to c), if touching of the operating surface by an operator has been detected:

1.e) changing to a first actuation-expected state, and 1.f) assigning a defined force value to the base force value,

OR 2.a) detecting a current actual force value of an operating force applied to the operating surface, 2.b) determining a force signal gradient of the applied and detected operating force as a function of the actual force signal and comparing the determined force signal gradient with a predefined gradient threshold value, if the determined force signal gradient does not exceed the predefined force signal threshold value:

2.c) assigning the detected, current actual force value to a base force value, and 2.d) repeating steps a) to c), if the determined force signal gradient exceeds the predefined force signal threshold value:

2.e) changing to a first actuation-expected state, and 2.f) assigning a defined force value to the base force value.

Steps 1.a) to 1.f) and 2.a) to 2.f) can either be carried out in parallel or one after the other, for example steps 2.a) to 2.f) after steps 1.a) to 1.f) or only after steps g) and h), which will be explained in more detail below. Alternatively, steps 2.a) to 2.f), for example, and possibly also steps g) and h) can be carried out before steps 1.a) to 1.f).

The individual steps 1.x and 2.x (where "x" defines a placeholder) can also be carried out in a different order in each case (if it makes technical sense), for example steps 1.b) and 1.a) can be swapped, as can steps 1.d) and 1.c) or steps 1.e) and 1.f) and the respective steps 2.x accordingly.

In an advantageous embodiment of a method according to the present invention, particularly preferably, when the operator input device is in the first actuation-waiting state or in the second actuation-waiting state, in particular following step 1.f) and/or 2.f) in each case, the following steps are also carried out:

g) determining whether the operating input device is actuated, and h) outputting a corresponding operating signal, wherein the determination of whether the operating input device is actuated is carried out in particular by determining whether a sufficient operating force is applied while the operating input device is in the first actuation-expected state or in the second actuation-expected state, wherein the operating input device is particularly preferably recognized as "actuated" if the detected applied operating force is recognized as sufficient.

It is particularly preferred if it is determined whether the operating input device is actuated, in particular whether a sufficient operating force is applied, while the operating input device is in the first actuation-expected state or in the second actuation-expected state, in that a difference between the current actual force value of the actual force signal and the current base force value is determined and the determined difference is compared with a predetermined difference threshold value, wherein an applied operating force is recognized as sufficient or the operating input device is recognized as "actuated" and a corresponding operating signal is output if the determined difference exceeds the predetermined difference threshold value, in particular as soon as the determined difference exceeds the predetermined difference threshold value. This makes it particularly easy to recognize operating inputs with a high true positive rate.

Furthermore, it is particularly preferred that an operating signal is subsequently generated and output, i.e., after the operating input device has been recognized as "actuated", in particular depending on the recognized actuation, wherein the operating signal in a vehicle can be output, for example, to a corresponding infotainment system connected to the operating input device or to a data bus or the like.

Once the operating signal has been generated and output, the next step preferably involves a change back to the unactuated initial state.

In a further advantageous embodiment of a method according to the invention, particularly preferably when the operating input device is in the second actuation-waiting state, the operating input device is in particular only recognized as "actuated", and a corresponding control signal is preferably only generated and output when the determined difference has exceeded the predetermined threshold value and, in addition, contact with the control surface is detected, preferably within a defined time window after an applied control force has been recognized as sufficient. I.e., in other words, in the second actuation-expected state, an actuation is particularly preferably only recognized as successful if not only a sufficient operating force has been applied to the operating surface or the difference between the actual force signal value and the base force value has exceeded the predefined difference threshold value, but also if contact has been recognized, in particular within a defined time window after an applied operating force has been recognized as sufficient.

This enables particularly good detection accuracy to be achieved. For example, operating inputs can also be mapped in this way in which an operator first applies an operating force to the operating surface outside a touch-sensitive area of the operating surface and then guides his finger into the operating surface while applying sufficient operating force. This makes it particularly easy to use, as the user does not need to reposition their finger to make a successful entry.

In a particularly preferred embodiment of a method according to the invention, the defined force value which is assigned to the base force value in step 1.f) or in step 2.f) is in particular a frozen actual force value of an operating force applied to the operating surface and detected, in particular the frozen actual force value which was detected at the time the contact with the operating surface was detected or at the time the gradient threshold value was exceeded.

In principle, however, the defined force value assigned to the basic force value in step 1.f) or in step 2.f) can also be a stored or otherwise determined force value, in particular a force value stored in the evaluation apparatus or calculated by means of the evaluation apparatus or the like.

In a further advantageous embodiment of a method according to the invention, a change is preferably made from the first actuation-expected state back to the unactuated initial state if contact with the operating surface is no longer detected before an actuation has been detected. In particular, this can take place immediately as soon as it is detected that the operating surface is no longer being touched, or with a time delay, in particular with a predefined time delay, which can be stored as a constant value in the evaluation apparatus, for example.

Particularly preferably, as soon as the operating input device is back in the unactuated initial state, the basic force value is tracked to the actual force signal, wherein the current value of the actual force signal is preferably assigned to the basic force value, wherein in particular a new value is assigned to the basic force value with each newly detected actual force signal.

In a further possible, likewise advantageous embodiment of a method according to the invention, a change is also made in particular from the second actuation-expected state to the first actuation-expected state if contact is detected in the second actuation-expected state, before a sufficient actuation force has been detected, wherein in particular the base force value is updated, in particular the actual force value is refrozen, in which the actual force value that was detected at the time of detection of the touching of the operating surface is assigned to the base force value. This can also take place immediately after detection of the contact or again with a defined time delay, which can also preferably be stored in the evaluation apparatus.

In a further advantageous embodiment of a method according to the invention, after an actuation has been detected, a change is made back to the unactuated initial state, in particular from the first actuation-expected state and/or from the second actuation-expected state, as soon as the determined force signal gradient of the applied and detected operating force falls below the predefined gradient threshold value again, and/or contact is no longer detected, and/or a predefined delay time has elapsed after the end of contact.

Particularly preferably, the system only switches back to the unactuated initial state when the three aforementioned conditions are cumulatively met, i.e., only as soon as the determined force signal gradient of the applied and detected operating force falls below the predefined gradient threshold value again, AND contact is no longer detected, AND a defined delay time has elapsed after the end of contact.

A method according to the invention enables a particularly advantageous evaluation of the sensor signals, by means of which a high recognition accuracy of the operating inputs and consequently a high operating comfort can be achieved in a simple manner.

The embodiments explained and described with reference to an operator input device according to the invention and their advantages and features also apply accordingly to a method according to the invention for operating such an operator input device and vice versa, provided that these are technically expedient.

Further features of the invention can be found in the claims, the figures, and the description of the figures. All of the features and combinations of features that are cited in the description above, and also the features and combinations of features that are cited in the description of the figures below and/or as shown in the figures alone, can be used not only in the respectively indicated combination but also in other combinations or on their own. The invention will now be explained in more detail on the basis of a preferred, non-limiting exemplary embodiment and with reference to the accompanying figures.

Figure 2:
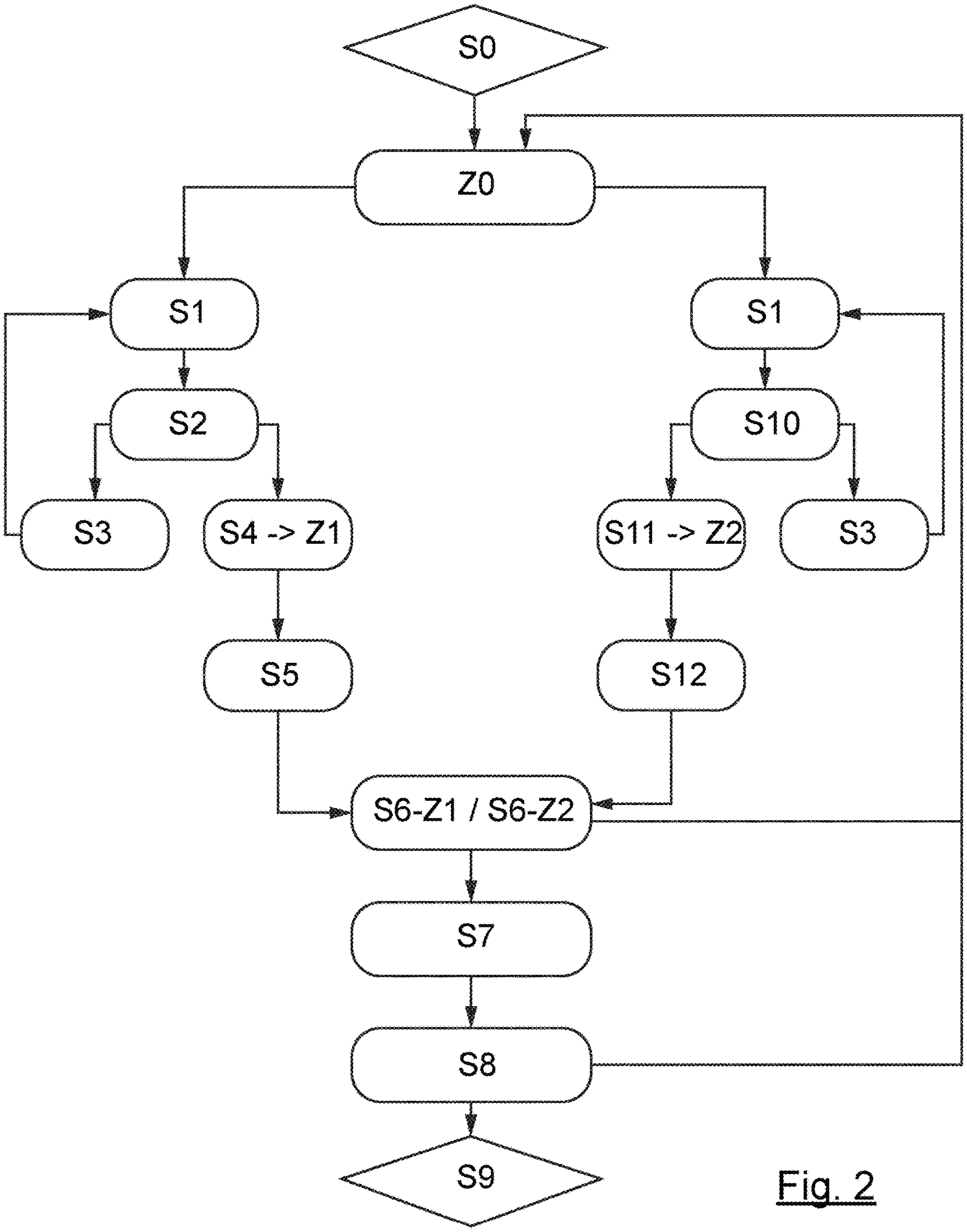
Figure 3:
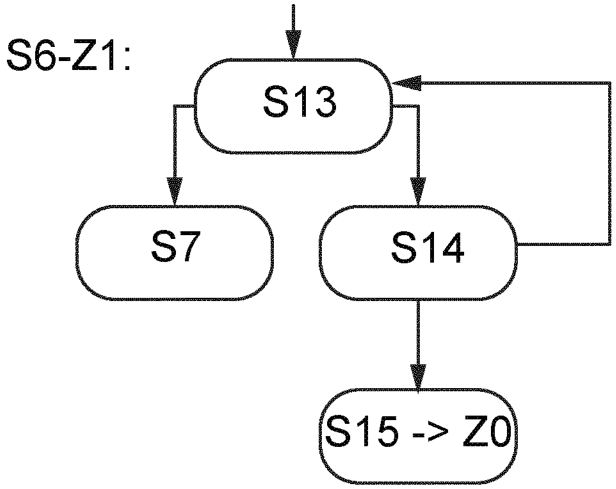
Figure 4:
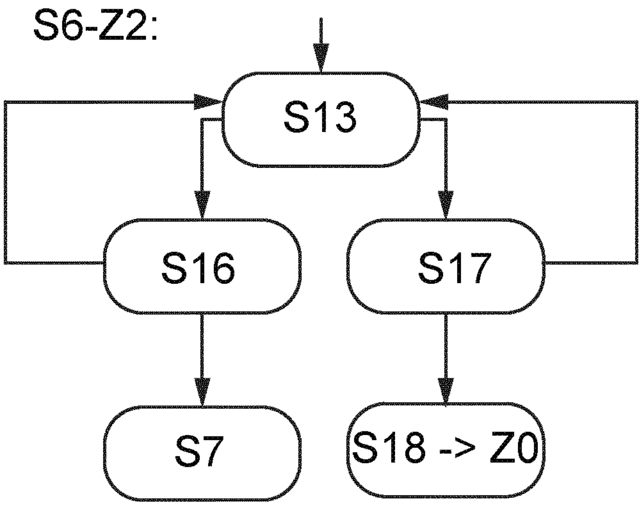
Figure 5:
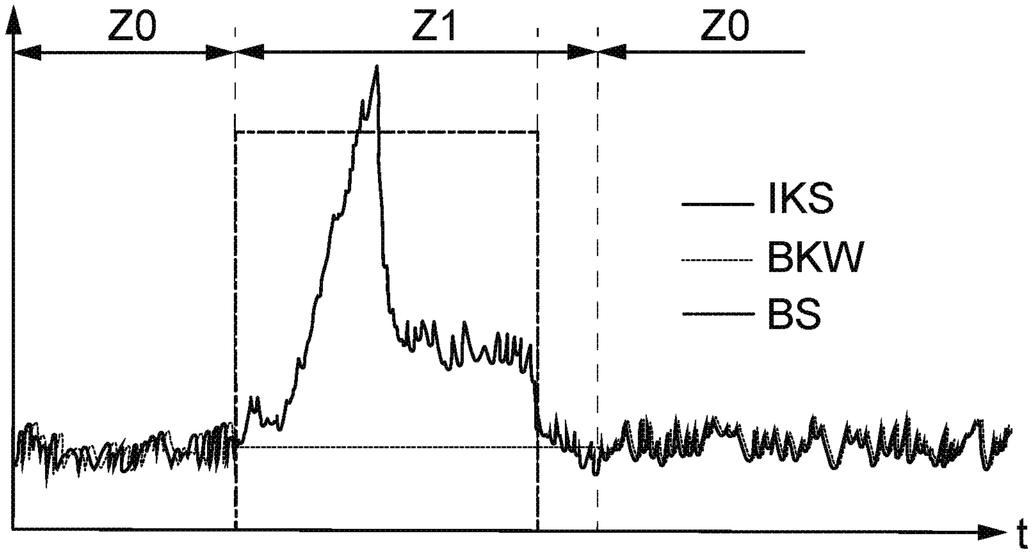

The figures show:

FIG. 1 a schematic illustration of an exemplary embodiment of a head-up display according to the invention, FIG. 2 a flow diagram for explaining an embodiment of a method according to the invention for operating an operator input device according to the invention, FIG. 3 a flow diagram to explain process step S6-Z1 from FIG. 2, FIG. 4 a flow diagram to explain process step S6-Z2 from FIG. 2, and FIG. 5 an exemplary diagram from the operation of an operating input device according to the invention in accordance with a method according to the invention with the signal curve over the time of the actual force signal, the base force value and the touch signal.

FIG. 1 shows a schematic representation of a control input device 10 according to the invention, which is designed for use in a motor vehicle, in particular for use in the interior of a passenger car, and is used to operate at least one infotainment system function.

The operating input device 10 has an operating surface 11 and a capacitive touch sensor device 20 for recognizing a touch of the operating surface 11 by an operator, in particular by a finger 50 or a human hand of an operator.

Furthermore, the operating input device 10 also has a MEMS force sensor device 30 for detecting a current operating force F applied to the operating surface 11.

Furthermore, according to the invention, the operating input device 10 has an evaluation apparatus 40 for determining an actuation state of the operating input device 10.

The touch sensor device 20 is set up here to generate a touch signal BS and output it to the evaluation apparatus 40. The force sensor device 30 is set up to generate an actual force signal IKS, which is dependent on the current operating force F applied and contains at least one piece of signal information characterizing a current actual force value, and also to output it to the evaluation apparatus 40.

The evaluation apparatus 40 is set up to determine the actuation state of the operating input device 10 as a function of the touch signal BS, the actual force signal IKS and an associated basic force value BKW (see FIG. 5), which is not shown here, and to generate and output an operating signal BDS characterizing the actuation state of the operating input device 10.

The operating input device 10 is designed to assume an unactuated initial state Z0, a first actuation-expected state Z1 and a second actuation-expected state Z2 (see FIGS. 2 to 5). According to the invention, in the unactuated initial state, the current basic force value BKW corresponds to the value of the currently detected actual force signal IKS or a current applied operating force F, whereas in an actuation-expected state Z1 or Z2, the current basic force value BKW is a defined force value, in this case a frozen and thus constant actual force value at a defined point in time from the past.

This exemplary embodiment of an operating input device 10 according to the invention is set up to change from the unactuated initial state Z0 to the first actuation-expected state Z1 when a touch of the operating surface 11 by an operator, for example by a finger 50 of a human hand, is detected.

Furthermore, this exemplary embodiment of an operating input device 10 according to the invention is also set up to determine a force signal gradient, in particular a temporal gradient, of the applied and detected operating force F as a function of the actual force signal IKS, and to compare the determined force signal gradient with a predefined gradient threshold value and, if the determined force signal gradient exceeds the predefined gradient threshold value, to change from the unactuated initial state Z0 to the second actuation-expected state Z2.

To determine whether a sufficient operating force F is being applied to the operating surface 11, the operating input device 10 is also designed and set up to determine a difference between the current actual force value of the actual force signal IKS and the current base force value BKW and to compare the determined difference with a predetermined difference threshold value.

In this operating input device 10, the evaluation apparatus 40 is set up to recognize the operating input device as "actuated" when the operating input device 10 is in the first actuation-waiting state and to generate and output a corresponding operating signal BDS if the determined difference exceeds the predetermined difference threshold value.

If, on the other hand, the operating input device 10 is in the second actuation-expected state, at this operating input device 10 an actuation or an operating input is only recognized as successful or the operating input device 10 is only recognized as "actuated" and a corresponding operating signal BDS is only generated and output if, in addition, a touch of the operating surface 11 has been detected by the touch sensor device 20 within a defined time window after the determined difference has exceeded the predetermined threshold value.

I.e., in other words, a successful operating input is recognized in this operating input device 10 if either, starting from the unactuated initial state Z0, a touch is first recognized and then a sufficient operating force F is applied to the operating surface 11 so that the determined difference exceeds the predefined difference threshold value, or if, starting from the unactuated initial state Z0, a determined force signal gradient first exceeds the predefined threshold value and then a sufficient operating force F is applied so that the determined difference exceeds the predefined difference threshold value, and furthermore a touch is detected within a defined time window after the difference threshold value has been determined to have been exceeded.

If in the first actuation-expected state Z1, before a successful actuation is detected, no more contact with the operating surface 11 is detected, this exemplary embodiment of an operating input device 10 according to the invention changes from the first actuation-expected state Z1 back to the unactuated initial state Z0.

If a touch is detected in the second actuation-expected state Z2 before a sufficient operating force F has been detected, the operating input device 10 changes from the second actuation-expected state Z2 to the first actuation-expected state Z1, wherein in this case, when changing from the second actuation-expected state Z2 to the first actuation-expected state Z1, the basic force value BKW is preferably updated, in particular refrozen, in particular by assigning to the basic force value BKW the actual force value that was recorded at the time the touch of the operating surface 11 was detected.

With reference to FIGS. 2 to 5, a method according to the invention for operating the control input device 10 according to the invention shown in FIG. 1 is explained below by way of example.

After a start in step S0, in this initial example of a method according to the invention, the operator input device 10 according to the invention from FIG. 1 is initially in an unactuated initial state Z0, in which the basic force value BKW corresponds in each case to the current actual force value of the actual force signal IKS and thus the basic force value BKW tracks the actual force signal IKS, which is clearly recognizable from the first area of FIG. 5, in which the operator input device 10 is in state Z0.

After detecting a current operating force F applied to the operating surface 11 in a vertical direction in step S1, in this exemplary embodiment a check is first carried out in step S2 using the capacitive touch sensor device 20 to determine whether the operating surface 11 is being touched, in particular by a finger 50 of a human hand or the like.

If, as shown in FIG. 2 as an example, contact is detected in a step S2 during this test, the operating input device 10 changes to a first actuation-expected state Z1 (step S4) and the base force value BKW is assigned, in particular in a further step S5, the actual force value recorded at the time of detection of the contact until further notice, so that the base force value BKW now no longer follows the actual force signal IKS until further notice, but is constant (see FIG. 5).

In a further step S6-Z1, the system now checks whether the expected actuation or operating input has actually taken place. How this is done will be explained in the further course of this application with reference to FIGS. 3 and 4.

If, however, no contact is detected in step S2, the operating force detected in step S1 and applied to the operating input device or the associated, determined actual force value is assigned to the basic force value BKW, so that the basic force value follows or tracks the actual force value, and step S1 is repeated in a next cycle.

If, as expected, an actuation or a successful operating input has been detected, a corresponding operating signal BDS is generated and output in step S7.

In a further step S8, it is then checked whether the operating input or actuation has ended or is still present, wherein in this initial example of a method according to the invention, the operating input or actuation is recognized as having ended when a determined force signal gradient falls below the predefined threshold value again, no more contact is detected and a predefined delay time has elapsed after the contact has ended. This is shown, for example, in FIG. 5, which is explained in more detail below.

If this is the case, the operating input device 10 returns to the unactuated initial state Z0 or operation of the operating input device 10 is ended with step S9.

After step S8 and the change back to the unactuated initial state Z0, a current operating force F applied to the operating surface 11 is again detected in this operating input device 10 in a second cycle by means of the force sensor device 30 and a corresponding actual force signal IKS is generated and output to the evaluation apparatus 40, here in a step also designated S1.

The output actual force signal IKS is evaluated in step S10 by the evaluation apparatus 40, wherein in particular a gradient of the actual force signal IKS is determined, in particular over time, and compared with a predefined gradient threshold value. If the force signal gradient exceeds the predefined gradient threshold value, the operating input device 10 changes to a second actuation-expected state Z2 (step S11). In addition, the actual force value recorded at the time the gradient threshold was exceeded is assigned to the base force value BKW until further notice, so that the base force value BKW is now also initially constant again.

Step S6-Z2 then checks whether the operating input device 10 has been successfully actuated. If this is the case, a corresponding operating signal BDS is also generated and output in the subsequent step S7, as already explained previously in connection with step S6-Z1.

In step S8, the system then checks again whether the actuation or the operator input has been completed and, if so, switches back to the unactuated initial state Z0 or, alternatively, terminates operation of the operator input device 10 in step S9.

With reference to FIG. 3, the check in step S6-Z1 as to whether an actuation or a successful operator input of the operator input device 10 is present, starting from the first actuation-expected state Z1, in which the operator input device 10 is located when, starting from the unactuated initial state Z0, a touch has initially been detected (see step S2), is explained in more detail below.

For this purpose, step S13 first checks whether, in addition to touching the operating surface 11, a sufficient operating input force F is also applied to the operating surface 11, wherein a difference between the currently detected actual force signal IKS or an associated actual force value and the base force value BKW is determined for this purpose, and the difference is compared with a predefined difference threshold value, in particular a difference threshold value stored in the evaluation apparatus 40.

If the determined difference exceeds the predefined difference threshold value, a corresponding actuation or a successful operator input is recognized or the operator input device 10 is recognized as "actuated" and the process continues with step S7.

However, if the difference determined does not exceed the predefined difference threshold value, step S14 checks whether the contact is still present or not. If this is the case, go back to step S13. If this is not the case and the contact has ended in the meantime, the system returns to the unactuated initial state Z0 in step S15 and the currently detected actual force value or the value of the current actual force signal IKS is assigned to the basic force value again, i.e., the basic force value is tracked to the actual force signal IKS, as can be seen in the areas marked Z0 in FIG. 5.

FIG. 4 shows the check of a successful operating input in the second actuation-expected state Z2, wherein here too, after the change to the associated actuation-expected state Z2, the difference between the value of the actual force signal IKS and the basic force value BKW is first determined in step S13, and then the determined difference is compared with the predefined difference threshold value.

If the determined difference exceeds the difference threshold value, step S16 checks whether contact has also been detected within a defined time window since the difference threshold value was exceeded. If this is the case, the process continues with step S7 and a corresponding operating signal BDS is generated and output and the operating input device 10 is recognized as "actuated".

If no contact is detected within the predefined time window in step S16, the system returns to step S13. If no exceeding of the difference threshold value is determined in step S13, step S17 first checks whether a maximum permissible time since the change to the second actuation-expected state Z2 has been exceeded or not. If this is not the case, step S13 is repeated. If more time than permitted has elapsed since the change to the second actuation-waiting state Z2, the operating input device 10 changes back to the unactuated initial state Z0. This takes place in step S18, wherein the basic force value BKW is also tracked again to the actual force signal IKS and the current, recorded actual force value F is assigned to the basic force field BKW so that it is no longer constant.

For a better understanding, FIG. 5 shows, by way of example, a section of a signal curve of the actual force signal IKS, the basic force value BKW and the touch signal BS of the control input device 10 according to the invention from FIG. 1 during a method according to the invention for operating the control input device 10.

In an unactuated initial state Z0, no operating force F is initially applied to the operating surface 11 and the basic force value BKW is initially tracked to the actual force signal IKS, i.e., follows its course, wherein this is done by assigning each currently detected actual force value of the actual force signal IKS to the basic force value BKW immediately after its detection.

If a touch is now detected in this unactuated initial state Z0, as in the example shown in FIG. 5, illustrated by the touch signal BS, the operating input device 10 changes to the first actuation-expected state Z1 and the actual force value BKW detected at the time of detection of the touch is assigned to the basic force value BKW until further notice.

If the applied operating force F now increases in such a way that a difference between the actual force signal IKS or an associated value and the basic force value BKW exceeds a predefined difference threshold value, as is the case here at the maximum of the actual force signal IKS (not shown in detail), an actuation is detected and a corresponding operating signal BDS is generated and output (also not shown).

Once the operating input has ended, which is the case in particular when a determined force signal gradient falls below a defined gradient threshold value again, no more touch is detected and a predefined delay time has also elapsed since the end of the touch, symbolized here by the period between the falling edge of the touch signal BS and the change back to the unactuated initial state Z0, the operating input device 10 changes back to the unactuated initial state Z0 and the basic force value BKW is again tracked to the actual force signal IKS by assigning each newly detected actual force value to the basic force value BKW.

In deviation from the embodiments described, a large number of other embodiments are possible without leaving the scope of protection.

LIST OF REFERENCE SIGNS

10 operating input device according to the invention
11 operating surface
20 touch sensor device
30 force sensor device
40 evaluation apparatus
50 fingers of an operator
BDS operating signal
BS touch signal
F operating force
IKS actual force signal
S0 . . . S18 method steps
t time
Z0 unactuated initial state
Z1 first actuation-expected state
Z2 second actuation-expected state

The invention claimed is:

1. An operating input device for a motor vehicle, comprising:

an operating surface, at least one touch sensor device for detecting a touching of the operating surface by an operator, at least one force sensor device for detecting an actual operating force applied to the operating surface, and an evaluation apparatus for determining an actuation state of the operating input device, wherein the at least one touch sensor device is configured to generate and output a touch signal, wherein the at least one force sensor device is configured to generate and output an actual force signal dependent on the actual operating force applied, wherein the evaluation apparatus is configured to determine the actuation state of the operating input device at least as a function of the touch signal, the actual force signal and an associated current basic force value and to generate and output a corresponding operating signal characterizing the actuation state of the operating input device, wherein the operating input device is able to assume an unactuated initial state and at least one actuation-expected state, wherein in the unactuated initial state, the associated current basic force value corresponds to a value of the actual force signal, and in the at least one actuation-expected state, the associated current basic force value is a defined force value in each case, wherein, when the touching of the operating surface is detected, in order to change from the unactuated initial state to a first actuation-expected state, the evaluation apparatus is configured to:

determine a force signal gradient of an applied and detected operating force as a function of the actual force signal and to compare a determined force signal gradient with a predefined gradient threshold value, and when the determined force signal gradient of the applied and detected operating force exceeds the predefined gradient threshold value, change from the unactuated initial state to a second actuation-expected state.

2. The operating input device as claimed in claim 1, wherein the defined force value is a frozen actual force value which has been detected at a time of detection of contact with the operating surface or at a time of exceeding the predefined gradient threshold value.

3. The operating input device as claimed in claim 1, wherein the evaluation apparatus is configured to determine a difference between a current actual force value of the actual force signal and the associated current basic force value and to compare the difference with a predetermined difference threshold value, wherein the evaluation apparatus is configured to recognize the operating input device as "actuated" at least in a first of the at least one actuation-expected state and to output the corresponding operating signal if the difference exceeds the predetermined difference threshold value.

4. The operating input device as claimed in claim 3, wherein the evaluation apparatus is configured, when the operating input device is in a second of the at least one actuation-expected state, to detect the operating input device as "actuated" and to output the corresponding operating signal only if, in addition, contact with the operating surface is detected within a defined time window after the difference has exceeded the predetermined difference threshold value.

5. The operating input device as claimed in claim 1, wherein the operating input device is configured to switch from a first of the at least one actuation-expected state back to the unactuated initial state if, in the first of the at least one actuation-expected state, before an actuation has been detected, no more contact with the operating surface is detected.

6. The operating input device as claimed in claim 1, wherein the operating input device is configured to change from a second of the at least one actuation-expected state to a first of the at least one actuation-expected state if the touching is detected in the second of the at least one actuation-expected state before a sufficient operating force has been detected.

7. The operating input device as claimed in claim 1, wherein the operating input device is configured to update the associated current basic force value when changing from a second of the at least one actuation-expected state to a first of the at least one actuation-expected state by assigning to the associated current basic force value a current actual force value of the actual force signal which was detected at a time of detection of the touching of the operating surface.

8. The operating input device as claimed in claim 1, wherein the operating input device is configured to switch back to the unactuated initial state once an actuation has been detected, as soon as:

the determined force signal gradient of the applied and detected operating force falls below the predefined gradient threshold value again, the touching is no longer detected, or a defined delay time has elapsed after the touching has ended.

9. A method for operating an operator input device, the method comprising, at least temporarily in an unactuated initial state:

detecting a current actual force value of an operating force applied to an operating surface;

determining whether the operating surface is touched by an operator;

if no touching of the operating surface by the operator has been detected: assigning the current actual force value to a base force value; and repeating detecting the current actual force value, determining if the operating surface is touched by the operator, and assigning the current actual force value to the base force value;

when touching of the operating surface by the operator has been detected:

changing to a first actuation-expected state, and assigning a defined force value to the base force value, or detecting the current actual force value of the operating force applied to the operating surface;

determining a force signal gradient of the operating force as a function of the current actual force value and comparing the force signal gradient with a predefined gradient threshold value;

if the force signal gradient does not exceed a predefined force signal threshold value:

assigning the current actual force value to the base force value; and repeating detecting the current actual force value, determining the force signal gradient, and assigning the current actual force value to the base force value, if the force signal gradient exceeds the predefined force signal threshold value: changing to the first actuation-expected state; and assigning the defined force value to the base force value.

10. The method as claimed in claim 9, wherein, when the operator input device is in a first actuation-waiting state or in a second actuation-waiting state after the defined force value is assigned to the base force value, the method further comprising:

determining whether the operator input device is actuated and outputting a corresponding operating signal, wherein determining whether the operator input device is actuated is carried out by:

determining a difference between the current actual force value of an actual force signal and the base force value, and comparing the difference with a predetermined difference threshold value, wherein the operator input device is recognized as "actuated" at least in the first actuation-expected state and the corresponding operating signal is output if the difference exceeds the predetermined difference threshold value.

11. The method as claimed in claim 10, wherein when the operator input device is in the second actuation-waiting state, the operator input device is only recognized as "actuated" and the corresponding operating signal is only output if a touch of the operating surface is also detected within a defined time window.

12. The method as claimed in claim 10, wherein the defined force value which is assigned to the base force value is a frozen actual force value which was detected at a time of detection of contact with the operating surface or at a time of exceeding the predefined gradient threshold value.

13. The method as claimed in claim 10, wherein a change is made from the first actuation-expected state back to the unactuated initial state if contact with the operating surface is no longer detected before an actuation has been detected.

14. The method as claimed in claim 10, wherein, after an actuation has been detected, a change is made back to the unactuated initial state from the first actuation-expected state or from a second actuation-waiting state, as soon as:

- the force signal gradient of the operating force falls below the predefined gradient threshold value again,
- a touch is no longer detected, or
- a defined delay time has elapsed after the touch has ended.

* * * * *